(12) United States Patent
Biskeborn et al.

(10) Patent No.: US 11,776,569 B1
(45) Date of Patent: Oct. 3, 2023

(54) TAPE RECORDING SYSTEM AND METHOD FOR READING MEDIA HAVING WRITE-APPEND HEAD-POSITIONING BASED ON CHANGE IN TAPE LATERAL DIMENSION

(71) Applicant: Western Digital Technologies, Inc., San Jose, CA (US)

(72) Inventors: Robert G. Biskeborn, Hollister, CA (US); Trevor W. Olson, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/729,843

(22) Filed: Apr. 26, 2022

(51) Int. Cl.
G11B 5/733 (2006.01)
G11B 5/735 (2006.01)
G11B 5/55 (2006.01)
G11B 5/596 (2006.01)

(52) U.S. Cl.
CPC ............ G11B 5/553 (2013.01); G11B 5/5508 (2013.01); G11B 5/59688 (2013.01)

(58) Field of Classification Search
CPC ..... G11B 5/926; G11B 5/0086; G11B 5/4813; G11B 5/84; G11B 5/735; G11B 5/733; G11B 5/708; G11B 5/588; G11B 5/00826; G11B 5/5508; G11B 5/59638; G11B 5/73
USPC .......................................... 360/121, 75, 74.3
See application file for complete search history.

(56) References Cited

U.S. PATENT DOCUMENTS

| | | | |
|---|---|---|---|
| 3,508,231 A | 4/1970 | Levin | |
| 4,342,057 A | 7/1982 | LaBeau et al. | |
| 5,828,514 A | 10/1998 | Chliwnyj et al. | |
| 6,687,070 B1 | 2/2004 | Peterson et al. | |
| 7,982,994 B1 | 7/2011 | Erden et al. | |
| 8,797,682 B1 | 8/2014 | Biskeborn et al. | |
| 9,508,370 B1 | 11/2016 | Zhu et al. | |
| 9,607,633 B1 | 3/2017 | Toribio et al. | |
| 9,997,184 B1 * | 6/2018 | Bui | G11B 5/5926 |
| 10,482,922 B1 * | 11/2019 | Franklin | G11B 5/00817 |
| 10,607,645 B1 | 3/2020 | Hamaguchi et al. | |
| 11,295,772 B1 | 4/2022 | Watson et al. | |
| 2002/0085304 A1 | 7/2002 | Wang | |
| 2002/0163752 A1 | 11/2002 | Peterson | |
| 2012/0176698 A1 | 7/2012 | Rub | |
| 2013/0083419 A1 | 4/2013 | Springberg et al. | |
| 2013/0335856 A1 | 12/2013 | Tanabe et al. | |
| 2014/0198403 A1 | 7/2014 | Biskeborn et al. | |
| 2016/0307595 A1 | 10/2016 | Gao et al. | |
| 2018/0182432 A1 | 6/2018 | Liu et al. | |

* cited by examiner

Primary Examiner — Nabil Z Hindi
(74) Attorney, Agent, or Firm — PATTERSON + SHERIDAN, LLP; Steven H. VerSteeg

(57) ABSTRACT

The present disclosure generally relates to a tape drive comprising a tape head comprising one or more modules, wherein each module comprises a plurality of servo readers; a plurality of read elements; and a control circuitry configured to retrieve a priority servo reader designation for a bundle of data tracks of the plurality of data tracks, wherein the priority servo reader designation is one or more servo readers of the plurality of servo readers; use the designated priority servo reader to adjust a lateral position the tape head; retrieve a target delta Y position ($\Delta Ypos$); and adjust a tilt of the tape head based on the target $\Delta Ypos$.

21 Claims, 7 Drawing Sheets

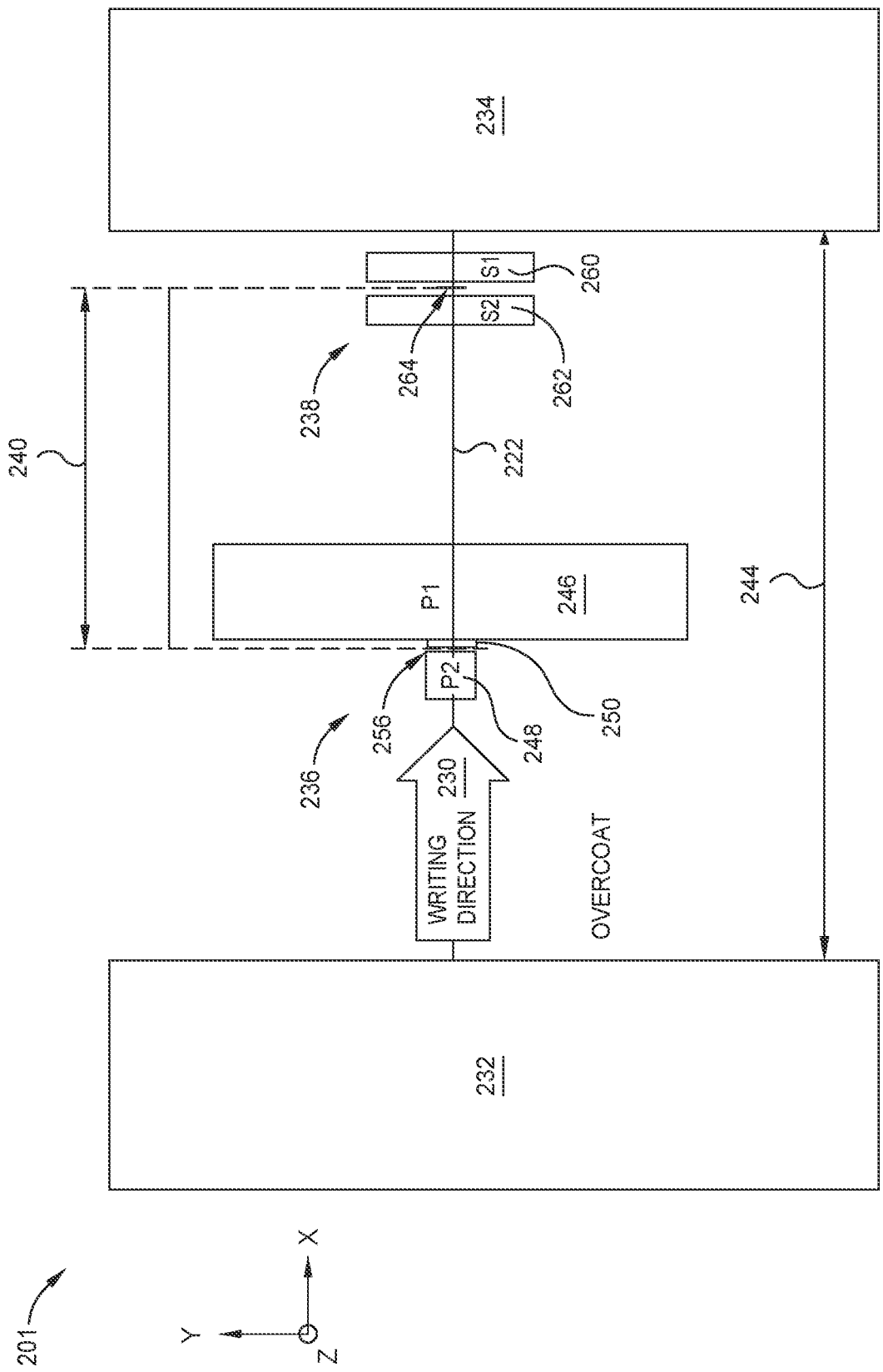

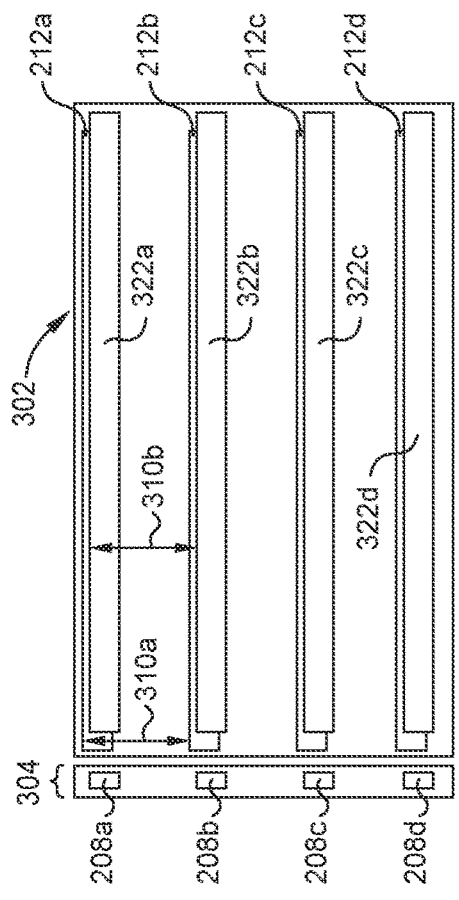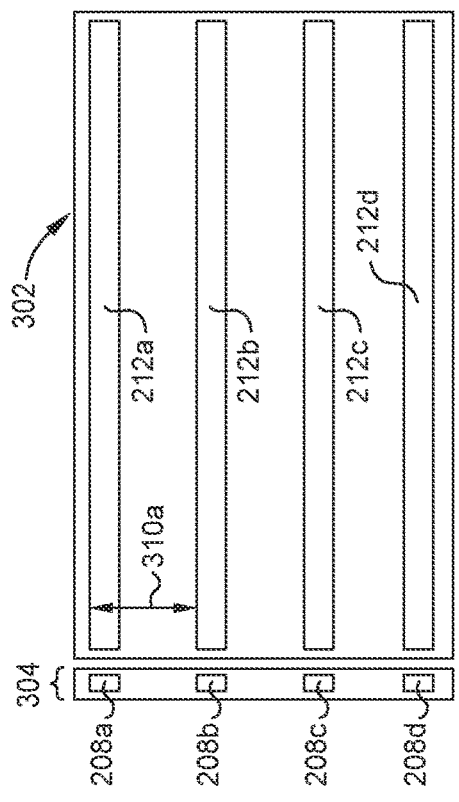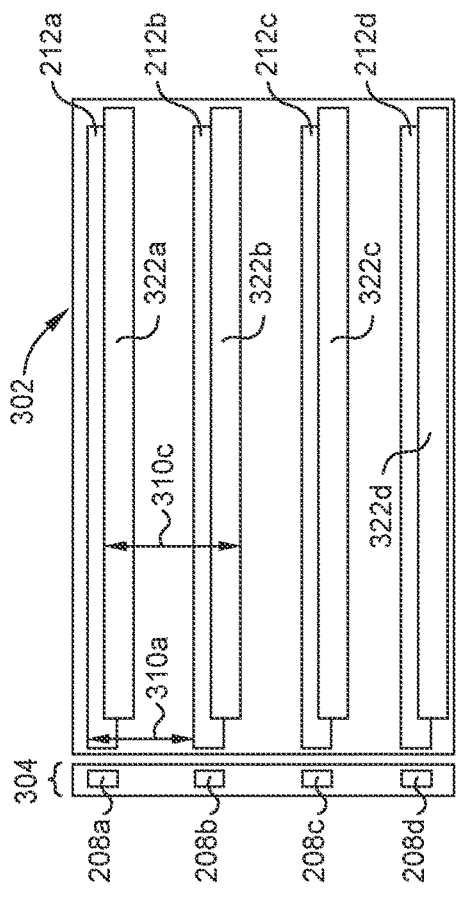
FIG. 3A
FIG. 3B
FIG. 3C

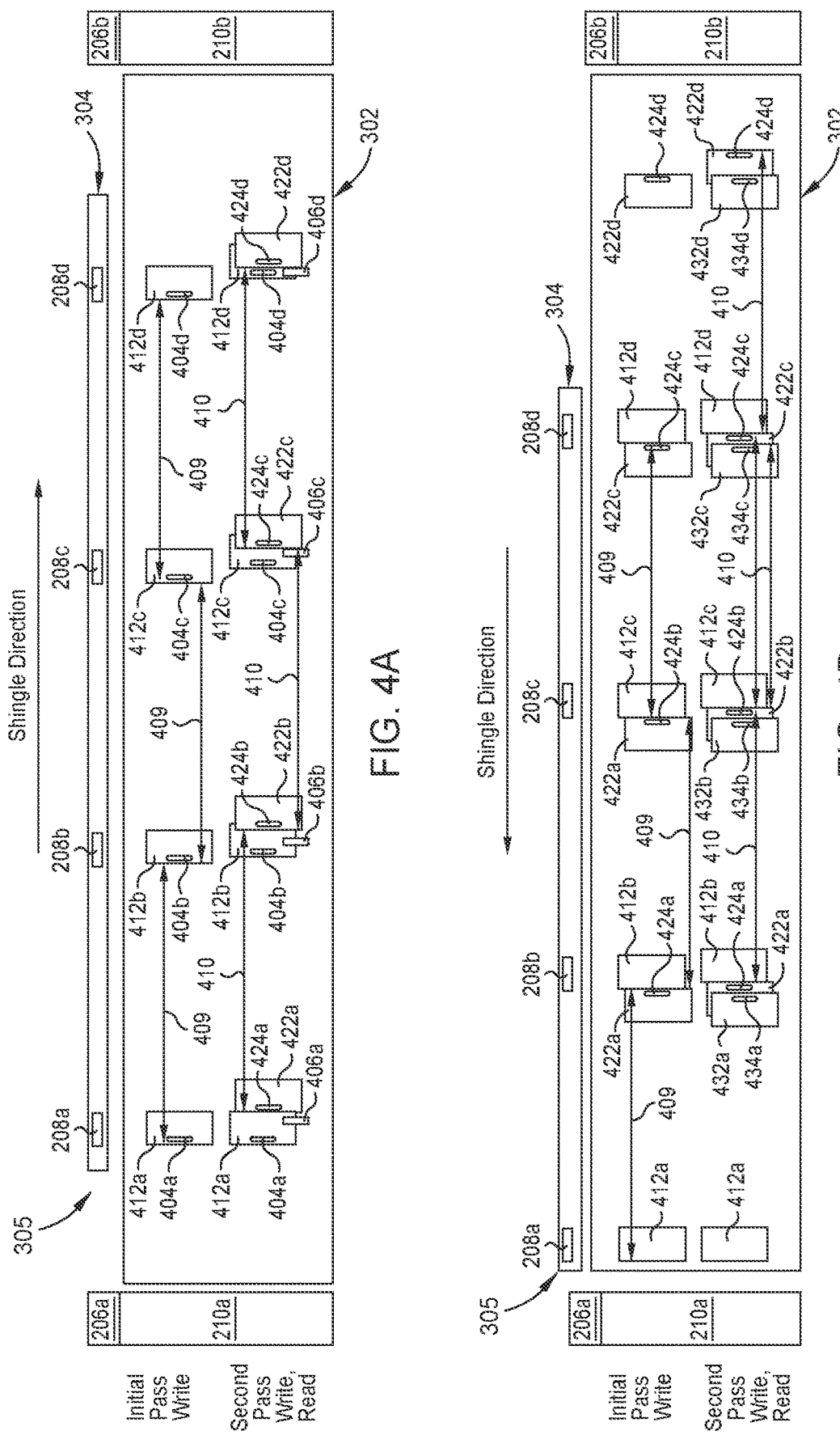

TAPE RECORDING SYSTEM AND METHOD FOR READING MEDIA HAVING WRITE-APPEND HEAD-POSITIONING BASED ON CHANGE IN TAPE LATERAL DIMENSION

BACKGROUND OF THE DISCLOSURE

Field of the Disclosure

Embodiments of the present disclosure are generally related to an apparatus and a method for positioning and tilting a plurality of read transducers of a tape drive.

Description of the Related Art

Conventional linear tape drive storage systems comprise at least a magnetic tape wound onto a supply reel, which may be contained in a cartridge; and a tape drive, comprising a tape head, which is comprised of magnetic transducers, the drive being configured to shuttle the magnetic tape between a supply and a take-up reel and pass the tape over the head during write/read operations. The format of the magnetic tape in a linear drive is multiple tracks that are defined linearly with respect to the longitudinal dimension along the length of the tape.

When data is initially written to the tape, the written tracks are aligned with the transducers in the magnetic recording head. However, when the tape is stored, the tape may shrink or expand in a direction that is transverse to the tape motion direction due to viscoelastic creep, tension, temperature, and/or humidity. Thereafter, the data written on the tracks may be contracted or expanded in relation to its original location. If there is too great a difference between the spacing of the tracks on the tape and the spacing of the transducers in the recording head, the data cannot be read back. This mis-registration phenomenon, which is due primarily to media dimensional instability, is often called 'TDS,' which stands for 'tape dimensional stability.'

Previous approaches for managing mis-registrations due to TDS include dynamically changing the tape tension to cause the spacing of the tracks on the tape to match the spacing of transducers in the head. However, this approach is limited by the tape's mechanical characteristics. Moreover, dynamically changing the tension of the tape may negatively affect tape packing. Another approach for managing TDS is to tilt a magnetic recording head assembly within a tape drive relative to the direction of the tape motion. Thereafter, the angle of the magnetic recording head assembly may be adjusted, thereby enabling the transducers in the head to be aligned with the tracks on the tape. However, in conventional tape heads, write and read-verify functions occur in separate head modules, which are of necessity widely separated from one another. This means that the poles of the write transducers must be wide enough to ensure that the read transducers remain in the envelope of their respective writers during tilting. However, wide write poles leads to reduced capacity and may have other drawbacks.

Therefore, there is a need in the art for a tape recording system that can effectively manage mis-registrations due to TDS.

SUMMARY OF THE DISCLOSURE

The present disclosure generally relates to a tape drive comprising a tape head comprising one or more modules, wherein each module comprises a plurality of servo readers; a plurality of read elements; and a control circuitry configured to retrieve a priority servo reader designation for a bundle of data tracks of the plurality of data tracks, wherein the priority servo reader designation is one or more servo readers of the plurality of servo readers; use the designated priority servo reader to adjust a lateral position the tape head; retrieve a target delta Y position ($\Delta Ypos$); and adjust a tilt of the tape head based on the target $\Delta Ypos$ In one embodiment, a tape drive, comprising: a tape head comprising one or more modules, each module comprising a plurality of read elements and a plurality of servo readers, wherein the plurality of read elements are configured to read a plurality of data tracks of a formatted tape; and a control circuitry configured to: retrieve a priority servo reader designation for a bundle of data tracks of the plurality of data tracks, wherein the priority servo reader designation is one or more servo readers of the plurality of servo readers; use the designated priority servo reader to adjust a lateral position the tape head; retrieve a target delta Y position ($\Delta Ypos$); and adjust a tilt of the tape head based on the target $\Delta Ypos$.

In another embodiment, a tape drive, comprising: a tape head comprising one or more modules, each module comprising a plurality of read elements and a plurality of servo readers, wherein the plurality of read elements are configured to read a plurality of data tracks of a formatted tape; and a control circuitry configured to: retrieve a first priority servo reader designation for a first bundle of data tracks of the plurality of data tracks, use the first designated priority servo reader to position the tape head for reading the first bundle of data tracks; retrieve a first target delta Y position ($\Delta Ypos$) of the first bundle of data tracks; adjust a tilt of the tape head based on the first target $\Delta Ypos$; control the plurality of read heads to read the first bundle of data tracks; retrieve a second priority servo reader designation for a second bundle of data tracks of the plurality of data tracks, wherein each of the first and the second priority servo reader designations is one or more servo readers of the plurality of servo readers; use the second designated priority servo reader to position the tape head for reading the second bundle of data tracks; retrieve a second target delta Y position ($\Delta Ypos$) of the second bundle of data tracks; adjust a tilt of the tape head based on the second target $\Delta Ypos$; and control the plurality of read heads to read the second bundle of data tracks.

In yet another embodiment, a tape drive, comprising: a tape head comprising one or more modules, each module comprising a plurality of read elements and a plurality of servo readers, wherein the plurality of read elements are configured to read a plurality of data tracks of a formatted tape; means for retrieving a priority servo reader designation, wherein the priority servo designation is one or more servo readers of the plurality of servo readers; means for adjusting a lateral position of the tape head; means for retrieving a target delta Y position ($\Delta Ypos$); and means for adjusting a tilt of the tape head based on the target $\Delta Ypos$.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2B illustrates a media facing surface (MFS) view of a data head assembly, according to one embodiment.

FIGS. 3A-3C illustrate shingle written tracks at varying track pitches.

FIG. 4A illustrates how tape expansion impacts reading data in an outbound write case.

FIG. 4B illustrates how tape expansion impacts reading data in an inbound write case.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1A:
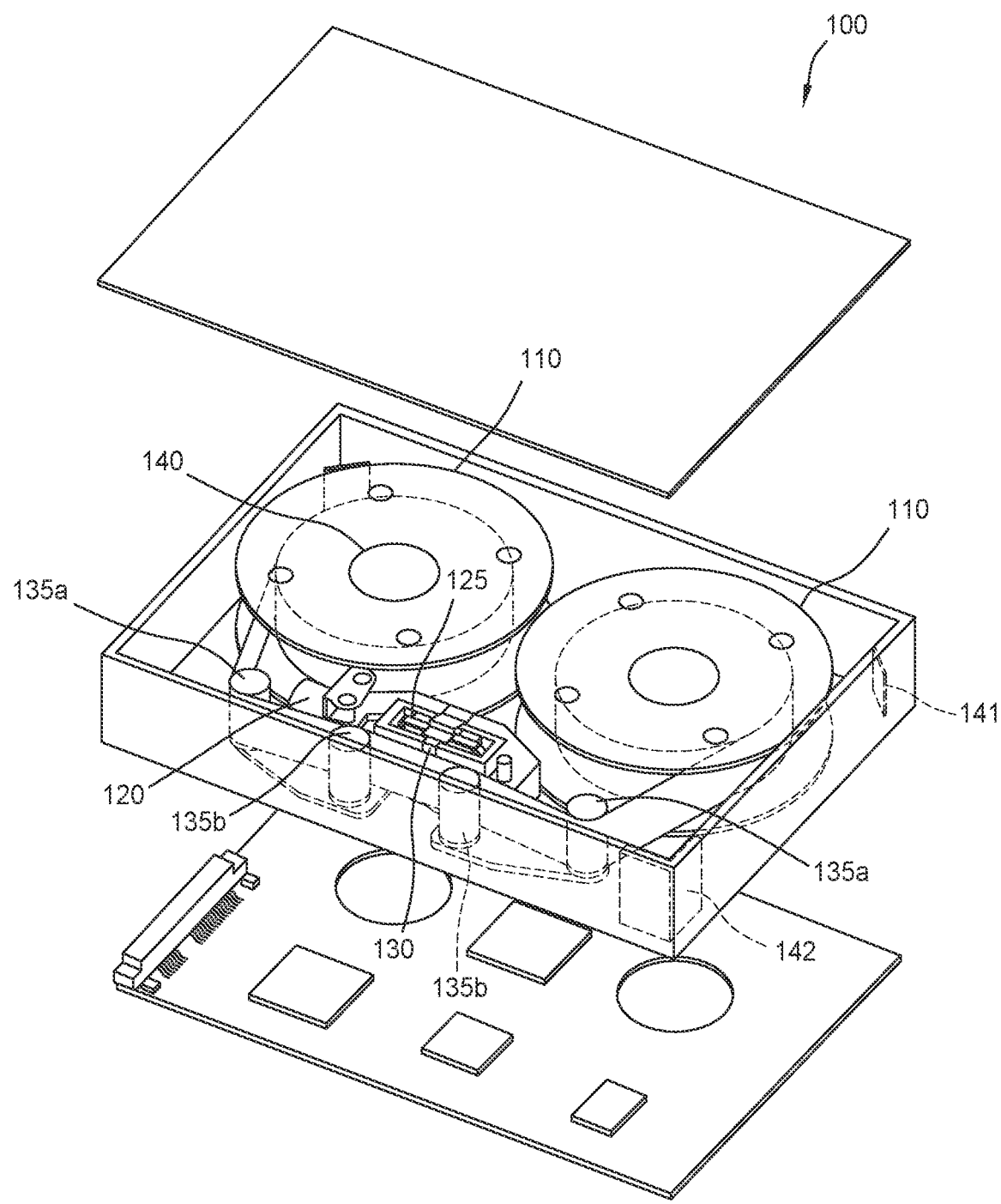
FIGS. 1A-1C illustrate a perspective exploded view, a simplified top down view, and a side profile view of a tape drive, in accordance with some embodiments.
Figure 1B:
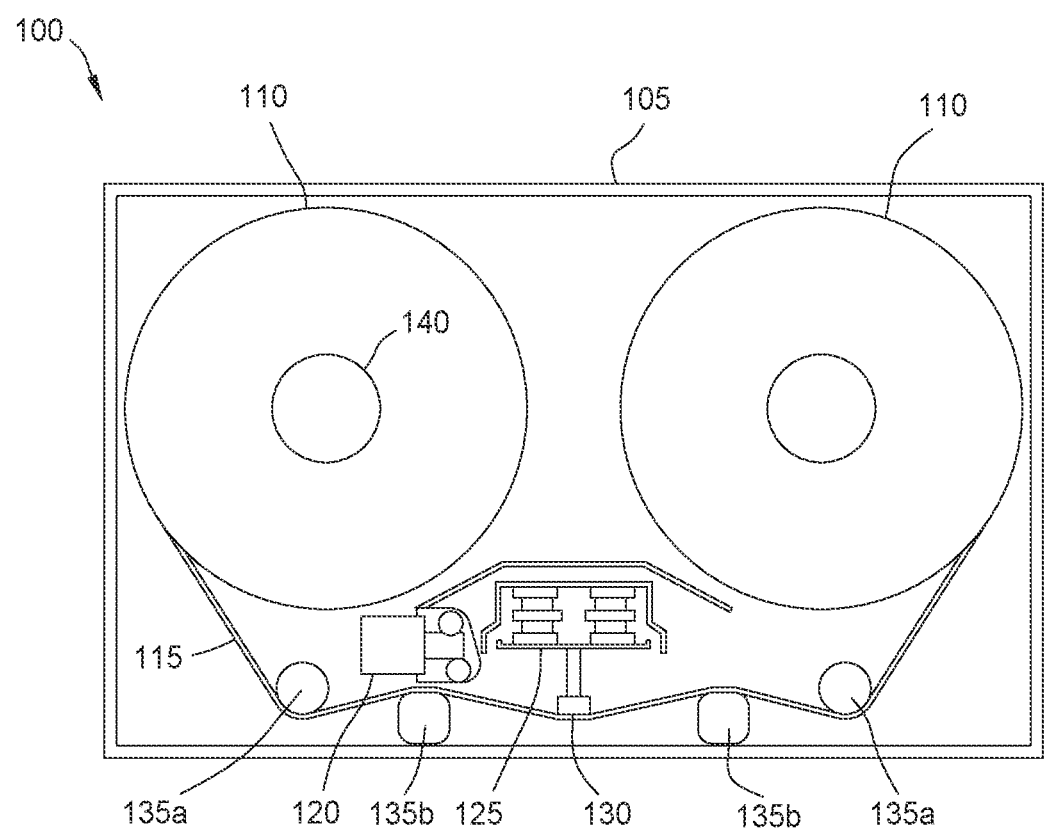
Figure 1C:
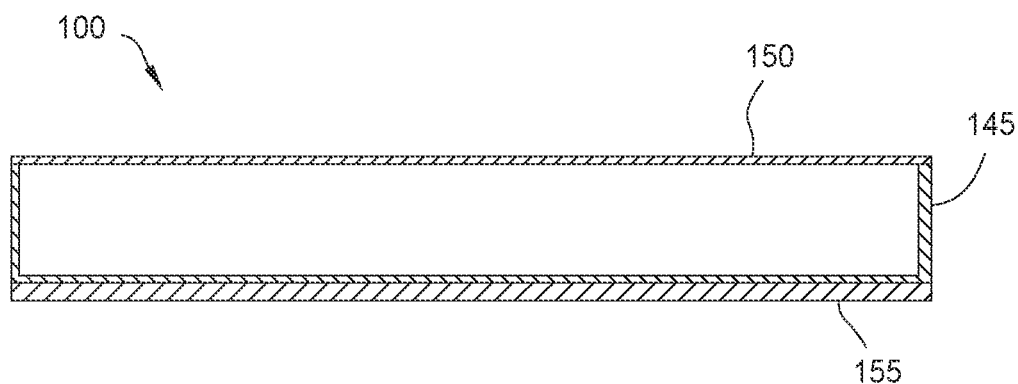

The present disclosure generally relates to a tape drive comprising a tape head comprising one or more modules, wherein each module comprises a plurality of servo readers; a plurality of read elements; and a control circuitry configured to retrieve a priority servo reader designation for a bundle of data tracks of the plurality of data tracks, wherein the priority servo reader designation is one or more servo readers of the plurality of servo readers; use the designated priority servo reader to adjust a lateral position the tape head; retrieve a target delta Y position ($\Delta Ypos$); and adjust a tilt of the tape head based on the target $\Delta Ypos$ FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read elements and one or more write elements, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the tape reel 110. One or more of the tape reels 110 may form a part of a removable cartridge and are not necessarily part of the tape drive 100. In such embodiments, the tape drive 100 may not be a tape embedded drive as it does not have embedded media, the tape drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or the tape media 115 is contained in a cartridge that is removable from the tape drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the tape reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s).

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the tape drive 100 may be hermetically sealed for environmental control by attaching (e.g., laser welding, adhesive, etc.) the cover 150 to the base 145. The tape drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the particle filters 141 and/or the desiccant 142 may be left out.

In various embodiments, the tape drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading of written data, as well as control of the tape head and media to achieve the same, may be controlled by the controller. As an example, the controller may be configured to move the read and write heads as described below.

Figure 2A:
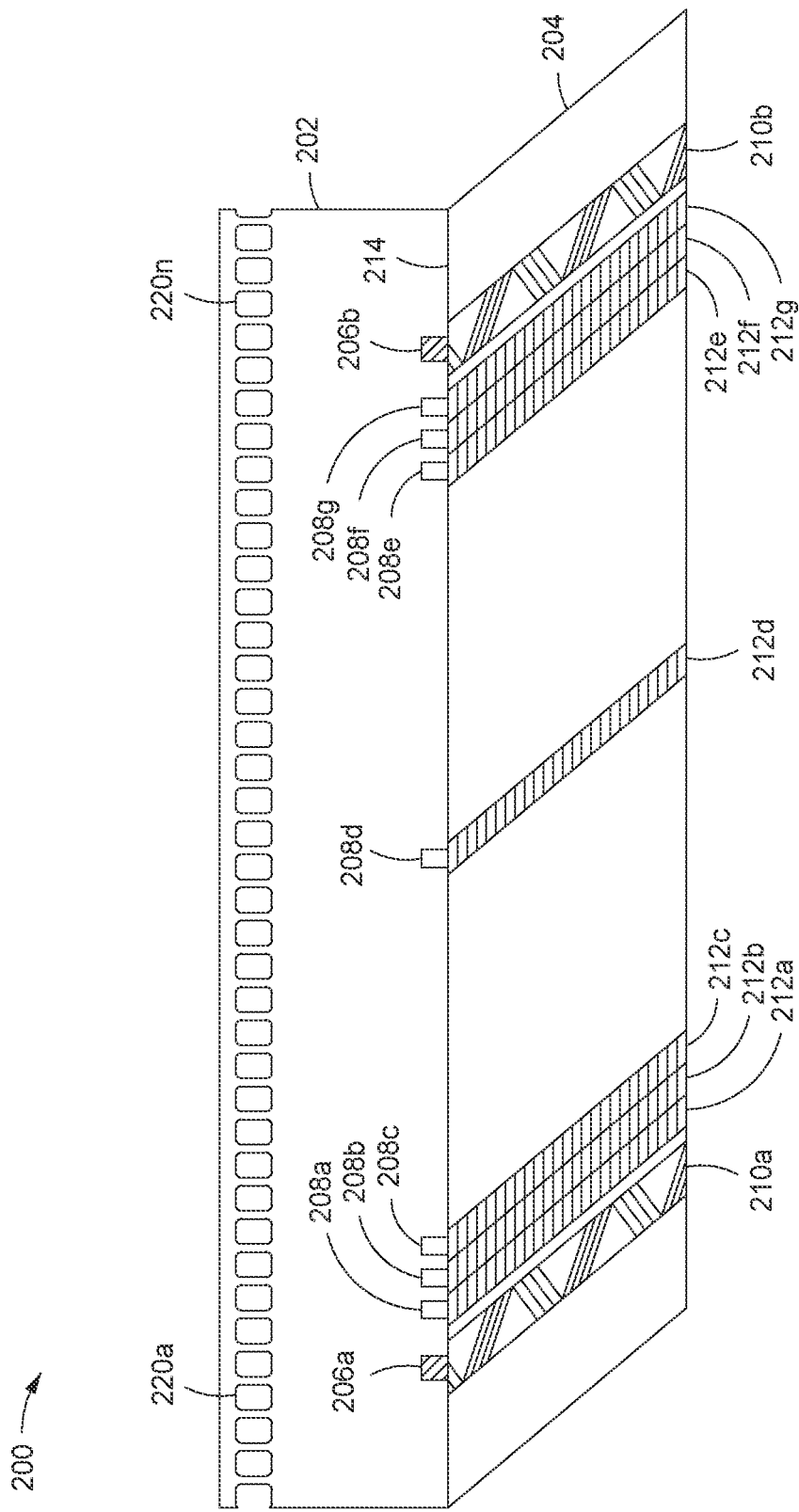
FIG. 2A is a schematic illustration of a tape head and tape that are aligned.

FIG. 2A is a schematic illustration of a tape head assembly 200 and a tape 204 that are aligned. The tape head assembly 200 comprises a tape head body 202 that is aligned with the tape 204. The tape 204 moves past the tape head assembly 200 during read and/or write operations. The tape head assembly 200 has a media facing surface (MFS) 214 that faces the tape 204.

The tape head body 202 comprises a first servo reader 206a and a second servo reader 206b spaced therefrom. It is to be understood that while two servo readers have been shown, the disclosure is not limited to two servo readers. Rather, it is contemplated that more or less servo readers may be present. A plurality of data heads or data elements 208a-208g are disposed between the first servo reader 206a and the second servo reader 206b. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202. The data heads comprise read elements and/or write elements. The read element may be integral to the write element, or the read element may be separate of the write element.

A plurality of pads 220a-220n is electrically coupled to the tape head body 202. The plurality of pads 220a-220n coupled to the tape head body 202 is not limited to the number shown in FIG. 2A. Rather, more or less pads are contemplated. The pads 220a-220n are used to connect the drive electronics to the first servo reader 206a and the second servo head 206b and to data read and write elements. The pads 220a-220n are used to establish the potential across the servo reader by means of a power supply (not shown) embedded in the tape head assembly 200.

The tape 204 comprises a first servo track 210a and a second servo track 210b. The first servo track 210a and the second servo track 210b are spaced apart allowing the tape head assembly 200 to monitor and control the average position of the data heads 208a-208g relative to the data tracks 212a-212g on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212a-212g disposed between the first servo track 210a and the second servo track 210b. It is to be understood that while seven data tracks have been shown, the disclosure is not limited to the seven data tracks. Rather, the number of data tracks can be more or less than seven, depending on the requirements of the embodiment. In the embodiment of FIG. 2A, the first servo reader 206a reads its lateral position information (e.g., alignment) over the first servo track 210a. The second servo reader 206b is aligned with the second servo track 210b.

FIG. 2B illustrates a MFS view of a portion of a module 201 of a tape head, according to one embodiment. The module 201 may be utilized within a tape drive comprising a controller, such as the TED 100 of FIG. 1A or an LTO drive. The module 201 may be within, or be a part of, the tape head assembly 200 of FIG. 2A.

The module 201 comprises a closure 232, one or more write transducers or write elements 236, which may be referred to as "writers" herein, disposed adjacent to the closure 232, one or more read transducers or read elements 238, which may be referred to as "readers" herein, disposed adjacent to the one or more write elements 236, and a substrate 234 disposed adjacent to the one or more read elements 238. Each of the one or more write elements 236 and the one or more read elements 238 are disposed on the substrate 234.

While only one writer 236 and one reader 238 pair is shown in FIG. 2B, the module 201 may comprise a plurality of writer 236 and reader 238 pairs, which may be referred to as a head array.

A writer 236 is spaced a distance 240 from a reader 238 of about 5 µm to about 20 µm, such as about 5 µm to about 15 µm. In embodiments comprising a plurality of writer 236 and a plurality of reader 238 pairs, each writer 236 is spaced a distance 240 from an adjacent paired reader 238. The closure 232 is spaced a distance 244 from the substrate 234 of about 20 µm to about 100 µm.

Each of the writers 236 comprises a first write pole P1 246 and a second write pole P2 248. A notch 250 is disposed on the P1 246. The notch 250 is disposed adjacent to a write gap 256, where the P1 246 is spaced from the P2 248 by a distance in the x-direction at least twice the length of the write gap 256. Each of the readers 238 comprises a first shield S1 260, a second shield 262, and a magnetic sensor 264 disposed between the S1 260 and the S2 262. The magnetic sensor 264 may be a tunnel magnetoresistance (TMR) sensor, for example. The write gap 256 and the magnetic sensor 264 are aligned or centered upon a center axis 222 in the y-direction such that the center axis 222 is aligned with a centerline of the magnetic sensor 264. In some embodiments, the distance 240 is measured from the write gap 256 to an MgO layer (not shown) of the magnetic sensor 264.

When writing data to a tape or other media, the tape moves over the writer 236 in the writing direction 230 (i.e., in the x-direction). Due to at least in part to the distance 240 between the write gap 256 and the magnetic sensor 264 of a writer 236 and a reader 238 pair, in some embodiments, the writer 236 is able to write to the media, and the reader 238 is able to read the data to verify the data was written correctly. Thus, the writer 236 is able to write data to a portion of the tape, and the paired reader 238 is able to read verify the newly written portion of the tape immediately. As such, the module 201 is able to write data to and read verify data from a tape concurrently.

The module 201 is able to concurrently write and read data due in part to the separation distance 240 between the write gap 256 and the magnetic sensor 264 of a writer 236 and reader 238 pair. The write gap 256 and magnetic sensor 264 are spaced far enough apart that the amplitude of signals in the reader 238 that arise from coupling of magnetic flux from the paired writer 236 is reduced or substantially less than the readback signal of the reader 238 itself. By spacing the writer 236 from the reader 238 by the distance 240, and by adjusting magnetic design parameters, such as magnetic shield dimensions, write transducer coil design, and optionally deploying additional shielding between the read and write elements 238, 236, a ratio of read signal to coupled writer signal amplitudes greater than about 30 dB may be achieved.

As used herein, the module 201 being able to "concurrently" write and read data refers to the fact that both the writer 236 and the reader 238 are concurrently turned "on" or able to operate simultaneously with respect to various data written to the tape. However, it is to be noted that the writer 236 and the reader 238 are not "concurrently" operating on the same data at the same time. Rather, the writer 236 first writes data, and as the tape moves over the reader 238, the reader 238 is then able to read verify the newly written data as the writer 236 concurrently writes different data to a different portion of the tape. Furthermore, it is to be noted that a controller (not shown) is configured to independently operate both the writer 236 and the reader 238. Thus, while the writer 236 is described as writing data and the reader 238 is described as reading the data, the controller enables the writer 236 to write and enables the reader 238 to read.

FIGS. 3A-3C illustrate shingle written tracks at varying track pitches, according to various embodiments. FIGS. 3A-3C illustrate a tape head 304 comprising one or more modules 305, where each module 305 comprises a plurality of data heads or data elements 208a-208d concurrently writing data to four tracks 212a-212b of a tape or media 302. While one module 305 is shown, the tape head 304 may comprise one or more modules 305. Each data element 208a-208d comprises a writer, and/or a reader, and/or a servo reader. For example, each data element 208a-208d may be the writer 236 of FIG. 2B and/or the reader 238 of FIG. 2B. The module 305 may be within, or be a part of, the module 201 of FIG. 2B, or the tape head assembly 200 of FIG. 2A.

It is to be understood that while four data elements 208a-20d and four tracks have been shown, the disclosure is not limited to such. Rather, the number of data elements and tracks can each individually be more or less than four, depending on the requirements of the embodiment.

In FIG. 3A, on an initial write, the four data elements 208a-208d write data to four data tracks 212a-212d of FIG. 2A. The write track pitch 310a (i.e., the distance between each of the data tracks 212a-212d) is defined by a distortion state of the magnetic tape at the time of the write as well as the lateral distance between the heads (which is fixed).

FIG. 3B illustrates shingled writing of data to the tape 302 on a second pass. During a write operation, one or more servo readers each individually read servo data or servo patterns from a servo track on the tape 302, which determines the location of the tape head 304 over the tape 302 based on the timing between the servo data or servo pattern. As such, one or more servo readers may be designated as a priority servo used during the write operation. It is to be understood that multiple write operations may occur, and each write operation of the multiple write operations may have a different priority servo reader designation. As such, the data may be written in bundles, wherein a bundle is a plurality data tracks of the tape 302 that were written to where the priority servo reader designation was the same. The priority servo reader designation(s) may be stored in a cartridge memory, a superblock preamble, a region of the tape, or another data storage device. As discussed below, the priority servo designation may be retrieved during a read operation in order to help position the tape head 304, thereby permitting the read elements of the tape head 304 to accurately read the shingle written data.

Turning back to FIG. 3B; here, data tracks 322a-322d are shingle written by offsetting the head 304 in the lateral direction a known amount, such that the data tracks 322a-322d overwrite or overlap with a portion of the data tracks 212a-212d. The data tracks 212a-212d are still readable. In this example, the track pitch 310a of the data tracks 212a-212d is the same as the track pitch 310b of data tracks 322a-322d. Therefore, there is no distortion of the tape. Thus, the data elements 208a-208d are easily aligned with the tape 302 on the second write. However, when the tape 302 becomes distorted, the track pitch may increase or decrease, as shown in FIG. 3C.

In FIG. 3C, for example, when data tracks 332a-332d are written on a second pass, the track pitch 310c is larger than the track pitch 310a of the data tracks 212a-212d. It is to be understood that although FIG. 3C shows an increase in the track pitch after an initial write, distortion of the magnetic tape 302 may also result in a decrease in track pitch. Thus, in addition to the priority servo reader designation, one or more Y position (Ypos) values may be continuously recorded and stored in a region of the tape. The Ypos is a lateral position of the tape head 304 and is determined by one or more servo readers of the tape head 304, such as the first and second servo readers 206a, 206b of FIG. 2A. Each servo reader may determine a Ypos value, and as such, there may be a plurality of Ypos values stored. A delta Ypos (ΔYpos) is the difference between the Ypos values of at least two servo readers (i.e., a difference between two Ypos values, wherein one Ypos value is determined by one servo reader, and a second Ypos value is determined by another servo reader).

For example, a first servo reader reading a first servo track or servo pattern may have a different timing than a second servo reader reading a second servo track or servo pattern. The difference between the timing and/or position of the first servo reader and the second servo reader is the ΔYpos. However, because the Ypos values are constantly being recorded, each bundle of data tracks may comprise one or more ΔYpos values. As discussed below, the one or more ΔYpos values may be retrieved during a read operation to determine if the tape 302 has expanded and/or contracted since the write operation. As such, the following embodiments focus on various methods for reading data that has been shingle written as described above.

For a detailed explanation of how data tracks are shingle written, see co-pending patent application titled "Data Storage Device Compensating For Magnetic Tape Distortion When Shingle Writing Data Tracks," U.S. application Ser. No. 17/471,028, filed Sep. 9, 2021, which is herein incorporated by reference.

FIG. 4A illustrates an example of how tape expansion impacts reading data in an outbound shingled write case (i.e., when the tape moves from a cartridge to a take up reel). Similar to FIGS. 3A-3C, the tape head 304 comprises one or more modules 305, where each module 305 comprises a plurality of data heads or data elements 208a-208d concurrently writing data to four tracks 212a-212b of a tape or media 302. While one module 305 is shown, the tape head 304 may comprise one or more modules 305. Each data element 208a-208d comprises a writer, and/or a reader, and/or a servo reader. For example, each data element 208a-208d may be the writer 236 of FIG. 2B and/or the reader 238 of FIG. 2B. The module 305 may be within, or be a part of, the module 201 of FIG. 2B, or the tape head assembly 200 of FIG. 2A.

During an initial pass, the data elements 208a-208d write data 404a-404d to data track snippets 412a-412d. On a second pass, the data elements 208a-208d write data 424a-424d to data track snippets 422a-422d. The snippets 412a-412d and 422a-422d may be a portion of the data tracks 212a-212d of FIGS. 2A and 3A-3C. The data tracks are further located on a tape media or media 302, such as the tape 204 of FIG. 2A. Similar to FIG. 2A, there may be more or less than four data tracks, depending on the requirements of the tape head.

During a read operation, the data elements 208a-208d are configured to read data 404a-404d from the data track snippets 412a-412d, and data 408a-408d from the data track snippets 422a-422d. During the read operation, a controller or control circuitry of the tape drive, such as the control circuitry of FIG. 1, is configured to first retrieve a priority servo reader designation.

Here, because the tape 302 was shingle written towards the servo reader 206b, servo reader 206b was the priority servo reader during the write operation. Thus, servo reader 206a was a non-priority servo reader. The controller retrieves this information, and uses servo reader 206b to move the tape head 304 in the lateral direction towards servo track 210b of the priority servo reader 206b. However, due to tape distortion, the tape head 304 may still be misaligned with the data and therefore data elements 208a-208d may not able to accurately read the data.

For example, here, the tape 302 has expanded since the data was written. Due to the tape distortion in the form of expansion, a first track pitch 409, corresponding to a spacing between each of the snippets 412a-412d is smaller than a second track pitch 410, corresponding to a spacing between each of the snippets 422a-422d. Therefore, laterally repositioning the tape head 304 alone is insufficient because the data elements 208a-208d will still be misaligned with the data tracks and will not be able to accurately read the data 404a-404d and 424a-424d. This is illustrated by locations 406a-406d, which show where the data elements 208a-208d would be positioned to read data if the position of the data elements 208a-208d was only laterally adjusted.

Therefore, the controller is further configured to retrieve one or more ΔYpos values that were recorded when the data was written. The controller may compare a current ΔYpos to the retrieved ΔYpos. If the current ΔYpos does not match the retrieved ΔYpos (i.e., a target ΔYpos), then the controller can determine if the tape 302 has expanded or contracted, and adjust a tilt angle of the tape head 304 by rotating the tape head 304 so that the current ΔYpos matches the target ΔYpos.

Here, because the tape 302 has expanded, the target ΔYpos is larger than current ΔYpos because the servos are further apart as compared to when the tape 302 was written to. Thus, it is not enough to only adjust the lateral position of the tape head 304 by using the priority servo to move the data elements 208a-208d towards the priority servo band because the data elements 208a-208d will still be misaligned with the data during a read operation. As such, in order to match the servo band spacing which ensures that the data elements 208a-208d are positioned correctly to read the data, the controller is configured to rotate the tape head 304 based on the target ΔYpos so that the data elements 208a-208d will be accurately aligned with the data during a read operation (i.e. the controller rotates the tape head 304 so that current ΔYpos matches the target ΔYpos). In expansion cases, the tape head 304 may be rotated in a counter-clockwise direction or in a clockwise direction.

It is to be understood that this process of retrieving priority servo designation and target ΔYpos, and adjusting the position of the tape head 304 during a read operation may be performed each time a read occurs, or multiple times during a read operation.

FIG. 4B illustrates an example of how tape 320 expansion impacts reading data in an inbound shingled write case (i.e., when the tape 302 moves from a take up reel to a cartridge). FIG. 4B is similar to FIG. 4A; however, here, the data tracks are shingle written in the inbound direction, opposite of the write direction of FIG. 4A. It is to be understood, that while FIG. 4B illustrates writing a third pass of the tape (i.e. writing data 434a-434d to snippets 432a-432d), this is not to be considered limiting. The tape may be written to any number of times, and three passes is merely shown for exemplary purposes.

Here, during a read operation, since the data was shingle written towards the servo reader 206a, servo reader 206a was the priority servo reader during the write operation. Thus, servo reader 206b was the non-priority servo reader. The controller retrieves this information, and uses the priority servo reader, servo reader 206a, to move the tape head 304 in the lateral direction towards servo track 210a of the priority servo reader 206a. However, due to tape expansion, the tape head 304 may still be misaligned with the data and therefore data elements 208a-208d are not able to accurately read the data because a first track pitch 409, representing a distance between snippets 412a-412d, is greater than a second track pitch 410, representing the distance between the tracks containing snippets 432a-432d.

Therefore, similar to FIG. 4A, the controller determines a difference between a target ΔYpos and current ΔYpos and rotates the head 304 based on the difference so that the data elements 208a-208d will be accurately aligned with the data during a read operation (i.e. the controller rotates the tape head 304 so that ΔYpos2 matches ΔYpos1). Similar to FIG. 4A, because the tape 302 has expanded, the tape head 304 may be rotated in a counter-clockwise direction or in a clockwise direction.

Figure 4C:
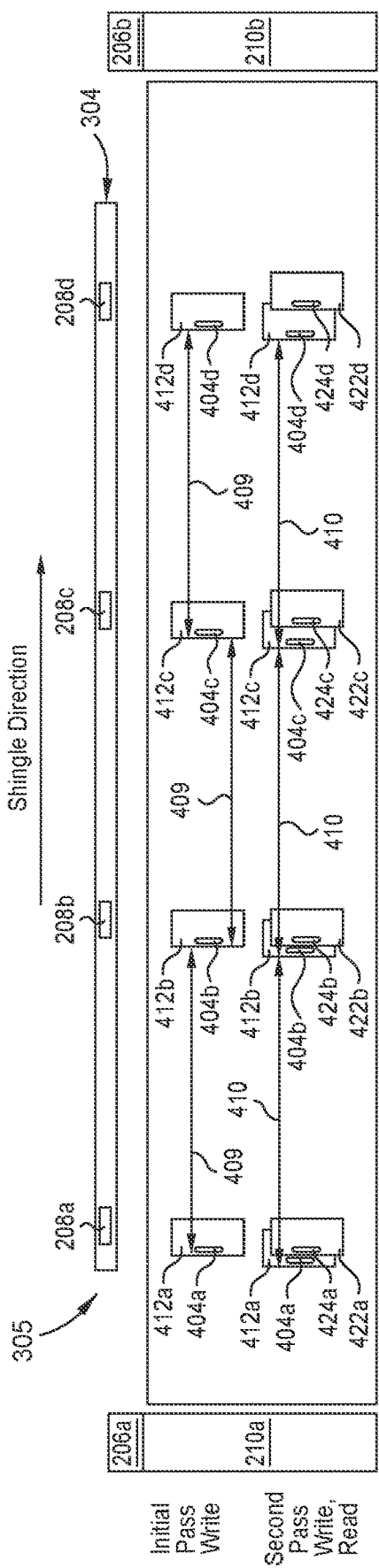
FIG. 4C illustrates how tape contract impacts reading data in an outbound write case.

FIG. 4C illustrates an example of how tape contraction impacts reading data in an outbound shingle write case. FIG. 4C is similar to FIG. 4A (i.e. the shingle write direction is the same); however, here the tape 302 contracts causing the first track pitch 409 to be larger than the second track pitch 410.

Thus, during a read operation, the controller is configured to retrieve the lateral position information, such as the ΔYpos, and adjust the lateral position and tilt angle of the head 304. Similar to FIG. 4A, because the data was shingle written towards servo reader 206b, servo reader 206b is the priority servo reader. Thus, the controller uses servo reader 206b to adjust the lateral position of the tape head 304 by moving the tape head 304 towards the servo track 210b. The controller is further configured to retrieve a target ΔYpos value that was recorded when the data was written, determine a current ΔYpos value, and determine a difference between the target ΔYpos and the current ΔYpos.

Here, because the tape has contracted, the target ΔYpos is smaller than the current ΔYpos because the servos readers 206a and 206b are closer together as compared to when the tape was written to. As such, in order to match the servo band spacing, which ensures that the data elements 208a-208d are positioned correctly to read the data, the controller is configured to rotate the tape head 304 based on the difference between the target ΔYpos and the current ΔYpos so that the head 304 will be aligned with the tracks during a read operation, thereby permitting data elements 208a-208d to accurately read the data (i.e. the controller rotates the tape head 304 so that the current Ypos value matches the stored Ypos value). In tape contraction cases, the tape head 304 may be rotated in a clockwise direction or in a counter-clockwise direction.

Figure 4D:
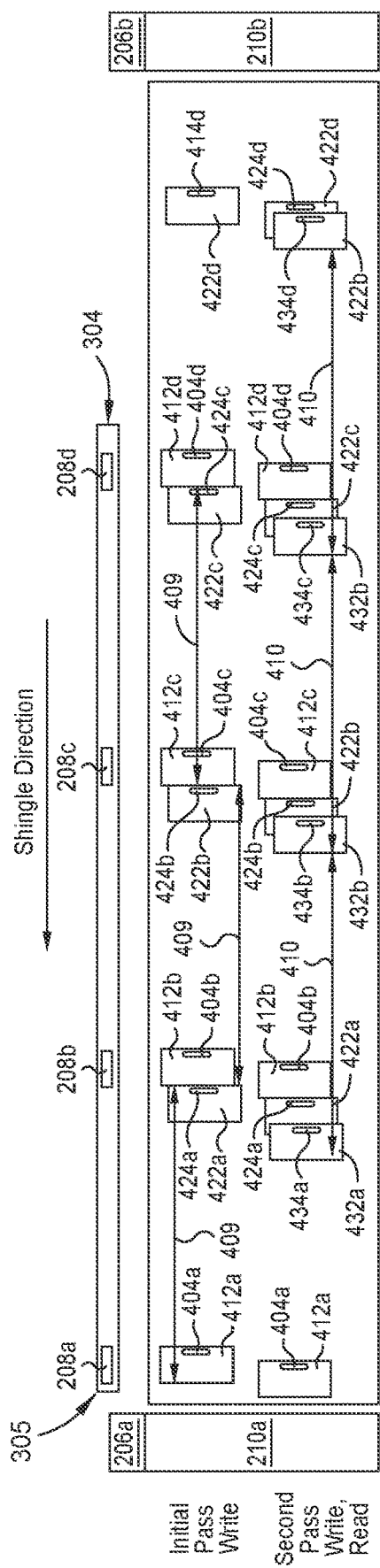
FIG. 4D illustrates how tape contract impacts reading data in an inbound write case.

FIG. 4D illustrates an example of how tape contraction impacts reading data in an inbound shingle write case. FIG. 4D is similar to FIG. 4B (i.e. the shingle write direction is the same); however, here the tape 302 has contracted causing the track pitch of the data tracks on successive passes to increase. Here, similar to FIG. 4B, during a write operation, the data was shingle written towards servo reader 206a. Thus, servo reader 206a was the priority servo during the write operation. The controller retrieves this information, and uses servo reader 206a to move the tape head 304 in the lateral direction towards servo track 210a of the priority servo reader 206a. However, prior to the read operation, the tape 304 has contracted, causing the first track pitch 409 to be smaller than the second track pitch 410. Therefore, the position of the head 304 will need to be further adjusted to permit the data elements 208a-208d to accurately read the data 404a-404d and 424a-424d.

Thus, the control is further configured to determine a difference between a target ΔYpos and a current ΔYpos, and rotate the head 304 based on the difference between target ΔYpos and the current ΔYpos so that the head 304 is aligned with the data tracks, thereby permitting data elements 208a-208d to read data 304a-304d, 324a-324d, and 334a-334d during a read operation (i.e. the controller rotates the tape head 304 so that the current ΔYpos matches the target ΔYpos). Similarly, to FIG. 4C, because the tape has contracted, the tape head 304 may be rotated in a clockwise direction or in a counter-clockwise direction.

It is to be understood that in the above embodiments, the format of the magnetic tape may be single track or multiple tracks that are defined linearly, diagonally, or arcuate with respect to the longitudinal dimension alone the length of the tape. With a linear track format, the read elements of the data elements may remain stationary relative to the longitudinal dimension of the tape. The write elements of the data elements may have a static tilt angle between about 0° and about 20°, and may be actuated in a lateral dimension across the width of the tape as the tape moves past the heads. When reading the tape, the read elements may be untilted relative to the static tilt angle of the write head, or the read elements may be dynamically tilted relative to the static tilt of the write elements as compared to the tilt angle of the data elements at the time of the write operation(s).

For example, if the tape has expanded prior to reading (see FIGS. 4A and 4B), the tape head 304 may be tilted counterclockwise relative to the tilt angle of the tape head 304 at the time of the write operation, thereby permitting the read elements to accurately read the data. Alternatively, if the tape has contracted prior to reading (see FIGS. 4C and 4D), the tape head 304 may be tilted clockwise relative to the tilt angle of the tape head 304 at the time of the write operation, thereby permitting the read elements to accurately read the data. Further, the read elements may comprise at least two selectable arrays, wherein each of the selectable arrays has a different track pitch.

With a diagonal or arcuate track format, the data elements may be mounted on a rotating drum such that during access operations, both the tape head 304 and the tape 302 are moved relative to one another (typically in opposite directions along the longitudinal dimension of the tape).

It is to be further understood that any suitable control circuitry may be employed in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in an SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

By retrieving lateral position information, and using the lateral position information to position a tape head, the tape head is able to be aligned with a tape media that has been distorted, and to accurately read data that was previously written to the tape media, regardless of whether the tape media has been distorted.

In one embodiment, a tape drive, comprising: a tape head comprising one or more modules, each module comprising a plurality of read elements and a plurality of servo readers, wherein the plurality of read elements are configured to read a plurality of data tracks of a formatted tape; and a control circuitry configured to: retrieve a priority servo reader designation for a bundle of data tracks of the plurality of data tracks, wherein the priority servo reader designation is one or more servo readers of the plurality of servo readers; use the designated priority servo reader to adjust a lateral position the tape head; retrieve a target delta Y position ($\Delta$Ypos); and adjust a tilt of the tape head based on the target $\Delta$Ypos.

The tape drive, wherein the priority servo reader designation is stored in at least one of a cartridge memory, a superblock preamble, one or more regions of the formatted tape, and a data storage device. The tape drive, wherein target $\Delta$Ypos is retrieved from the bundle of data tracks. The tape drive, wherein the plurality of read elements are configured to read shingle written data. The tape drive, wherein the priority servo reader designation is based on the direction of a shingled write of the shingle written data. The tape drive, wherein the control circuitry is further configured to determine the formatted tape has expanded based on the target $\Delta$Ypos. The tape drive, wherein the control circuitry is further configured to determine the formatted tape has contracted based on the target $\Delta$Ypos. The tape drive, wherein adjusting the tilt of the tape head comprises rotating the tape head in a clockwise direction. The tape drive, wherein adjusting the tilt of the tape head comprises rotating the tape head in a counter-clockwise direction. The tape drive, wherein using the designated priority servo reader to adjust the lateral position of the tape head comprises using the designated priority servo reader to move the tape head towards a servo track of the formatted tape associated with the designated priority servo reader. The tape drive, wherein the control circuitry is further configured to use a non-priority servo reader to adjust the lateral position the tape head.

In another embodiment, a tape drive, comprising: a tape head comprising one or more modules, each module comprising a plurality of read elements and a plurality of servo readers, wherein the plurality of read elements are configured to read a plurality of data tracks of a formatted tape; and a control circuitry configured to: retrieve a first priority servo reader designation for a first bundle of data tracks of the plurality of data tracks, use the first designated priority servo reader to position the tape head for reading the first bundle of data tracks; retrieve a first target delta Y position ($\Delta$Ypos) of the first bundle of data tracks; adjust a tilt of the tape head based on the first target $\Delta$Ypos; control the plurality of read heads to read the first bundle of data tracks; retrieve a second priority servo reader designation for a second bundle of data tracks of the plurality of data tracks, wherein each of the first and the second priority servo reader designations is one or more servo readers of the plurality of servo readers; use the second designated priority servo reader to position the tape head for reading the second bundle of data tracks; retrieve a second target delta Y position ($\Delta$Ypos) of the second bundle of data tracks; adjust a tilt of the tape head based on the second target $\Delta$Ypos; and control the plurality of read heads to read the second bundle of data tracks.

The tape drive, wherein the first target $\Delta$Ypos is different than the second target $\Delta$Ypos. The tape drive, wherein each module further comprises a plurality of write elements configured to perform write operations. The tape drive, wherein when the plurality of read heads are controlled to read, each module of the plurality of modules is dynamically tilted relative to a static tilt angle of each module at a time of a write operation. The tape drive, wherein when the plurality of read heads are controlled to read, each module of the plurality of modules is untilted relative to a static tilt angle of each module at a time of a write operation. The tape drive, wherein during a write operation, each module of the plurality of modules is tilted at a first angle, and when the plurality of read heads are controlled to read, each module of the plurality of modules is tilted at a second angle different than the first angle.

In yet another embodiment, a tape drive, comprising: a tape head comprising one or more modules, each module comprising a plurality of read elements and a plurality of servo readers, wherein the plurality of read elements are configured to read a plurality of data tracks of a formatted tape; means for retrieving a priority servo reader designation, wherein the priority servo designation is one or more servo readers of the plurality of servo readers; means for adjusting a lateral position of the tape head; means for retrieving a target delta Y position ($\Delta$Ypos); and means for adjusting a tilt of the tape head based on the target $\Delta$Ypos.

The tape drive, wherein the means for adjusting the lateral position of the tape head comprises using the designated priority servo reader to move the tape head towards a servo track of the formatted tape associated with the designated priority servo reader. The tape drive, wherein the means for adjusting the lateral position of the tape head comprises using a non-priority servo reader of a plurality of servo readers to move the tape head towards a servo track of the formatted tape associated with the designated priority servo reader. The tape drive, wherein the means for adjusting the tilt of the tape head comprises rotating the tape head so that a current ΔYpos of the tape head matches the target ΔYpos, wherein the current ΔYpos is a current position of the tape head.

What is claimed is:

1. A tape drive, comprising:
   a tape head comprising one or more modules, each module comprising a plurality of read elements and a plurality of servo readers, wherein the plurality of read elements are configured to read a plurality of data tracks of a formatted tape; and
   a control circuitry configured to:
     retrieve a priority servo reader designation for a bundle of data tracks of the plurality of data tracks, wherein the priority servo reader designation is one or more servo readers of the plurality of servo readers, and wherein the priority servo reader designation is stored in at least one of a cartridge memory, a superblock preamble, one or more regions of the formatted tape, or a data storage device;
     use the designated priority servo reader to adjust a lateral position the tape head;
     retrieve a target delta Y position (ΔYpos); and
     adjust a tilt of the tape head based on the target ΔYpos.

2. The tape drive of claim 1, wherein target ΔYpos is retrieved from the bundle of data tracks.

3. The tape drive of claim 1, wherein the plurality of read elements are configured to read shingle written data.

4. The tape drive of claim 3, wherein the priority servo reader designation is based on the direction of a shingled write of the shingle written data.

5. The tape drive of claim 1, wherein the control circuitry is further configured to determine the formatted tape has expanded based on the target ΔYpos.

6. The tape drive of claim 1, wherein the control circuitry is further configured to determine the formatted tape has contracted based on the target ΔYpos.

7. The tape drive of claim 1, wherein adjusting the tilt of the tape head comprises rotating the tape head in a clockwise direction.

8. The tape drive of claim 1, wherein adjusting the tilt of the tape head comprises rotating the tape head in a counter-clockwise direction.

9. The tape drive of claim 1, wherein using the designated priority servo reader to adjust the lateral position of the tape head comprises using the designated priority servo reader to move the tape head towards a servo track of the formatted tape associated with the designated priority servo reader.

10. The tape drive of claim 1, wherein the control circuitry is further configured to use a non-priority servo reader to adjust the lateral position the tape head.

11. A tape drive, comprising:
    a tape head comprising one or more modules, each module comprising a plurality of read elements and a plurality of servo readers, wherein the plurality of read elements are configured to read a plurality of data tracks of a formatted tape; and
    a control circuitry configured to:
      retrieve a first priority servo reader designation for a first bundle of data tracks of the plurality of data tracks,
      use the first designated priority servo reader to position the tape head for reading the first bundle of data tracks;
      retrieve a first target delta Y position (ΔYpos) of the first bundle of data tracks;
      adjust a tilt of the tape head based on the first target ΔYpos;
      control the plurality of read heads to read the first bundle of data tracks;
      retrieve a second priority servo reader designation for a second bundle of data tracks of the plurality of data tracks, wherein each of the first and the second priority servo reader designations is one or more servo readers of the plurality of servo readers;
      use the second designated priority servo reader to position the tape head for reading the second bundle of data tracks;
      retrieve a second target delta Y position (ΔYpos) of the second bundle of data tracks;
      adjust a tilt of the tape head based on the second target ΔYpos; and
      control the plurality of read heads to read the second bundle of data tracks.

12. The tape drive of claim 11, wherein the first target ΔYpos is different than the second target ΔYpos.

13. The tape drive of claim 12, wherein each module further comprises a plurality of write elements configured to perform write operations.

14. The tape drive of claim 13, wherein each module of the plurality of modules is dynamically tilted relative to a static tilt angle of each module of the plurality of modules at a time of a write operation.

15. The tape drive of claim 13, wherein each module of the plurality of modules is untilted relative to a static tilt angle of each module of the plurality of modules at a time of a write operation.

16. The tape drive of claim 13, wherein during a write operation, each module of the plurality of modules is tilted at a first angle, and when the plurality of read heads are controlled to read, each module of the plurality of modules is tilted at a second angle different than the first angle.

17. A tape drive, comprising:
    a tape head comprising one or more modules, each module comprising a plurality of read elements and a plurality of servo readers, wherein the plurality of read elements are configured to read a plurality of data tracks of a formatted tape;
    means for retrieving a priority servo reader designation, wherein the priority servo designation is one or more servo readers of the plurality of servo readers;
    means for adjusting a lateral position of the tape head;
    means for retrieving a target delta Y position (ΔYpos); and
    means for adjusting a tilt of the tape head based on the target ΔYpos.

18. The tape drive of claim 17, wherein the means for adjusting the lateral position of the tape head comprises using the designated priority servo reader to move the tape head towards a servo track of the formatted tape associated with the designated priority servo reader.

19. The tape drive of claim 17, wherein the means for adjusting the lateral position of the tape head comprises using a non-priority servo reader of a plurality of servo readers to move the tape head towards a servo track of the formatted tape associated with the designated priority servo reader.

20. The tape drive of claim 17, wherein the means for adjusting the tilt of the tape head comprises rotating the tape head so that a current ΔYpos of the tape head matches the target ΔYpos, wherein the current ΔYpos is a current position of the tape head.

21. The tape drive of claim 1, wherein the control circuitry is further configured to:
   determine a plurality of lateral Y position (Ypos) values of the tape head, and determine one or more delta Y positions (ΔYpos), the one or more ΔYpos being a difference between at least two Ypos values of the plurality of Ypos values.

* * * * *